United States Patent [19]

Duck et al.

[11] Patent Number: 4,950,715

[45] Date of Patent: Aug. 21, 1990

[54] SEALANTS AND ADHESIVES AND THE USE THEREOF

[75] Inventors: Edward W. Duck, Gaiberg, Great Britain; Ingolf Scheffler, Wiesloch, Fed. Rep. of Germany; Michael Hirthammer; Norman Blank, both of Heidelberg, Fed. Rep. of Germany

[73] Assignee: Teroson GmbH, Heidelberg, Fed. Rep. of Germany

[21] Appl. No.: 272,677

[22] PCT Filed: Feb. 9, 1988

[86] PCT No.: PCT/EP88/00093

§ 371 Date: Dec. 16, 1988

§ 102(e) Date: Dec. 16, 1988

[87] PCT Pub. No.: WO88/06165

PCT Pub. Date: Aug. 25, 1988

[30] Foreign Application Priority Data

Feb. 20, 1987 [DE] Fed. Rep. of Germany ....... 3705427

[51] Int. Cl.$^5$ ............................................. C08L 75/04

[52] U.S. Cl. ................................. 525/127; 204/157.77; 528/58; 528/59; 528/64

[58] Field of Search ................... 525/127; 204/157.77; 528/58, 59, 64

[56] References Cited

U.S. PATENT DOCUMENTS 3,755,261 8/1973 VanGullck .......................... 260/77.5
4,481,345 11/1918 Nachtkamp et al. ................. 528/64

Primary Examiner—Maurice J. Welsh
Attorney, Agent, or Firm—Steven T. Trinker

[57] ABSTRACT

Heat- and moisture hardening, one component polyurethane sealants and adhesives based on telechelic isocyanate prepolymers made from aromatic diisoyanates in stoichiometric excess and polyols comprise (a) a catalyst for moisture-hardening and (b) a blocked cross-linking agent activatable by heating, particularly a methylene dianiline/sodium chloride complex compound or a polyamino- or hydroxy-functional compound in microencapsulated form.

7 Claims, No Drawings

SEALANTS AND ADHESIVES AND THE USE THEREOF

Numerous formulations for sealants and adhesives are known, which contain prepolymers with telechelic isocyanate groups (produced from diisocyanates in stoichiometric excess with polyols) and which harden or set under the influence of moisture. When using aromatic isocyanates catalysts, such as in particular tin compounds, are added to these systems for speeding up hardening.

Such one-component PU systems are inter alia used in automobile manufacture for the direct glazing of motor vehicles. However, problems can occur if the atmospheric humidity is low, particularly in the case of lower temperatures in winter. The sealant then hardens so slowly, that the inserted panes or plates must be secured for a long period with the aid of suitable fixing devices. It is not possible to carry out further fitting work, e.g. the fastening of doors or working accompanied by the tilting of the body until the sealant has adequately hardened.

Although two-component PU systems are able to harden or set rapidly, they are much more difficult to handle and are much more complicated from the apparatus standpoint.

There is consequently a need for a one-component polyurethane based sealant and adhesive, which rapidly hardens to such an extent that adequate mechanical stability is achieved. However, complete curing, e.g. under the influence of moisture could take much longer without it impairing the fitting and assembly work.

For solving the aforementioned problems, the invention proposes a sealant and adhesive, which is both thermosetting and moisture-setting or initiating, so that it can be set by brief heating and then subsequently cured by moisture.

The known moisture-hardening PU-systems are only slightly accelerated by heat. However, it is known that prepolymers with terminal isocyanate groups can be crosslinked at elevated temperature, if a complex compound of methylene dianiline and sodium chloride is added thereto. At higher temperatures the methylene dianiline is decomplexed and reacts in a crosslinking reaction with the prepolymer. The mixture is stable in storage and is scarcely initiated by moisture at below the decomplexing temperature. It is also known that such PU systems can be heated and consequently hardened with the aid of microwaves (US patents 37 55 261 and 40 83 901).

The present invention therefore relates to thermosetting and moisture-setting one-component polyurethane sealants and adhesives based on telechelic isocyanate prepolymers of aromatic diisocyanates in stoichiometric excess and polyols, which are characterized in that they contain (a) a catalyst for moisture-setting and
(b) a blocked crosslinking agent, which can be activated by heating.

The inventive sealants and adhesives can be hardened by brief heating and the subsequent curing is brought about by moisture action. Such a system in particular makes it possible to solve the above-described problems linked with the direct glazing of motor vehicles on assembly lines.

The polyurethane prepolymers are produced in per se known manner from excess aromatic diisocyanate and a polyol. Suitable aromatic diisocyanates are e.g. diphenyl methane diisocyanate (MDI), toluylene diisocyanate (TDI), naphthalene diisocyanate, p-phenylene diisocyanate and 1,3-bis(isocyanatomethyl)-benzene and m or p-tetramethyl xylene diisocyanate (m-TMXDI or p-TMXDI).

The polyol component can be in the form of polyether polyols, such as polyethylene oxide, polypropylene oxide and their copolymers, as well as polyester polyols.

The preferred catalysts for moisture setting of the aromatic isocyanate prepolymers are tin compounds, such as tin(II)-octoate, dibutyl tin laurate and dibutyl tin maleate. It is also possible to use organo-mercury, lead and bismuth compounds, such as e.g. phenyl mercury acetate or lead naphthenate.

Examples of blocked crosslinking agents which can be activated by heating are complexed amines, particularly the complex compound of methyl dianiline (MDA) and NaCl. The formula for said complex compound is generally given as $(DA)_3.NaCl$. The compound can be obtained from Dupont under the trade name Caytur. The complex compound thermally decomposes by heating to temperatures between 120° and 160° C. and the liberated methylene dianiline leads to the crosslinking of the polyurethane prepolymer. Brief heating leads to incomplete crosslinking, but this gives the system an adequate mechanical strength. Complete curing and the attaining of the final strength are brought about by the isocyanate prepolymer reacting with moisture.

It is also possible to use as the crosslinking agent polyamino-functional or polyhydroxy-functional compounds, such as methylene dianiline or polyester polyols, which are microencapsulated and are consequently unavailable at ambient temperature for a reaction with the isocyanate prepolymer. Encapsulation can take place in a particularly favourable manner with the aid of methyl methacrylate or other (meth)acrylates, which only soften at temperatures above 100° C. Even if the polyamino-functional or polyhydroxy-functional compound is solid at ambient temperature and only softens as from approximately 60° C., a heating to temperatures above 100° C. leads to the softening of the envelope of the microcapsules and consequently to the release of the crosslinking agent. Such crosslinking agents have the advantage that they contain no NaCl or other metal salts.

The inventive one-component polyurethane system is characterized by excellent adhesion to metal and pretreated glass and is consequently particularly suitable for the direct glazing of automobiles. On adding corresponding fillers and rheology aids the system has an extremely good stability, so that it can be mechanically applied in the desired profile shape to the glass plates and can be inserted therewith in the motor vehicle body. As a result of a planned partial curing at clearly defined points of the glass/metal laminate, it is possible to fix the plate in a very short time with an adequate strength, so that sliding off is prevented. The partial hardening or curing of the sealant makes it unnecessary to additionally mechanically fix the glass plate. The complete curing of the sealing material takes place subsequently by reacting with the atmospheric humidity present.

In a particularly favourable manner rapid heating of the sealant can be brought about by thermosetting using microwaves and as a result of which only the sealant is heated. For example, if desired, it is possible after inserting a glass plate in the vehicle body to fix same in punctiform manner only by local heating with the aid of the microwave source, the further curing taking place by the moisture-hardening characteristics of the inventive sealant, as defined hereinbefore.

The following example serves to further illustrate the invention, but the invention is not limited thereto.

EXAMPLE

An inventive sealant was produced from the following components:
52.44% by weight of polyether diisocyanate (30% plasticizer content)
31.35% by weight of carbon black and calcium carbonate in the weight ratio 2:1
13.97% by weight of $C_7$–$C_{11}$-phthalate as the plasticizer
0.20% by weight of nickel-dibutyl dithiocarbamate
0.04% by weight of dibutyl tin maleate
2.00% by weight of complex compound $(MDA)_3.NaCl$.

This sealing compound could be hardened in a few seconds by heating to temperatures between 120° and 160° C. (e.g. with microwaves). Postcuring took place under the action of moisture and provided a sealing material which was mechanically satisfactory in all respects.

We claim:

1. A heat- and moisture hardening, one component polyurethane sealant and adhesive based upon telechelic isocyanate prepolymers made from aromatic diisocyanates in stoichiometric excess and polyols, characterized in that it comprises
   (a) a tin compound catalyst for moisture hardening and
   (b) a blocked cross-linking agent activatable by heating.

2. A sealant and adhesive according to claim 1 characterized in that it comprises a methylenedianiline/sodium chloride complex compound as cross-linking agent.

3. A sealant and adhesive according to claim 1 characterized in that i comprises a polyamino- or hydroxyfunctional compound in microencapsulated form as cross-linking agent.

4. Sealant and adhesive according to claim 3, characterized in that the polyamino-functional or hydroxy-functional compound is solid at ambient temperature, but liquid at temperatures above 60° C.

5. Sealant and adhesive according to one of the claims 3 and 4, characterized in that the envelope of the microcapsules comprises a poly(meth)acrylate, particularly a polymethyl methacrylate.

6. A method of direct glazing of motor vehicles that comprises
   application to the motor vehicle of a sealant and adhesive of claim 1,
   heating the sealant and adhesive to effect at least partial hardening, and
   curing the sealant and adhesive by application of moisture.

7. A method of claim 6 wherein microwave irradiation is used to heat the sealant and adhesive.

* * * * *